United States Patent

[11] 3,526,250

| [72] | Inventor | Larry J. Miller<br>3810 Shoals, Drayton Plains, Michigan 48020 |
|---|---|---|
| [21] | Appl. No. | 829,495 |
| [22] | Filed | June 2, 1969 |
| [45] | Patented | Sept. 1, 1970<br>Division of Ser. No. 573,601, filed Aug. 19, 1966. |

[54] SINGLE HANDLE FAUCET VALVE
4 Claims, 7 Drawing Figs.
[52] U.S. Cl. ................................................ 137/625.4,
137/636.3
[51] Int. Cl. ...................................................... F16k 11/06
[50] Field of Search ........................................... 137/625.4,
625.17, 636.3

[56] References Cited
UNITED STATES PATENTS

| 3,023,784 | 3/1962 | Monson | 137/625.17 |
| 3,035,612 | 5/1962 | Lyon | 137/625.17 |

Primary Examiner—M. Cary Nelson
Assistant Examiner—Michael O. Sturm
Attorney—Barnes, Kisselle, Raisch and Choate ABSTRACT: A single handle faucet valve comprising a body defining a chamber having a flat wall surface with hot and cold water inlets extending through the surface. A control disc with a complementary flat surface is provided in contact with the flat wall surface of the chamber and has spaced openings movable into and out of registry with the inlet openings. A sealing member is provided adjacent the control member and engages the control member. A retainer overlies the sealing member. A lever is journalled for rotation between the retainer and the sealing member and has an end thereof interconnected with the control member.

INVENTOR
LARRY J. MILLER
Barnes, Kisselle,
Raisch & Choate
ATTORNEYS

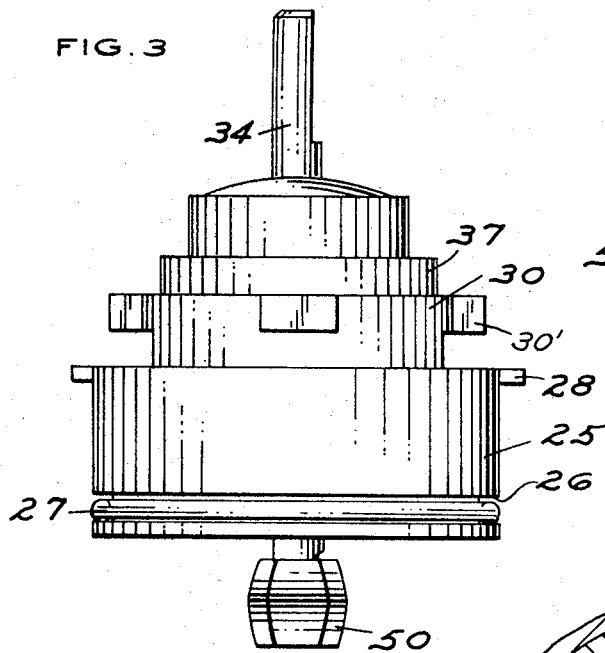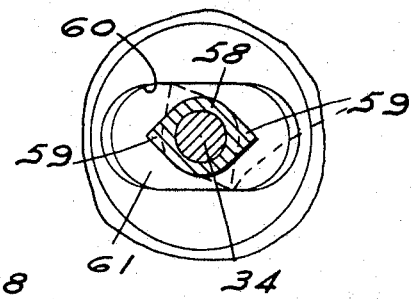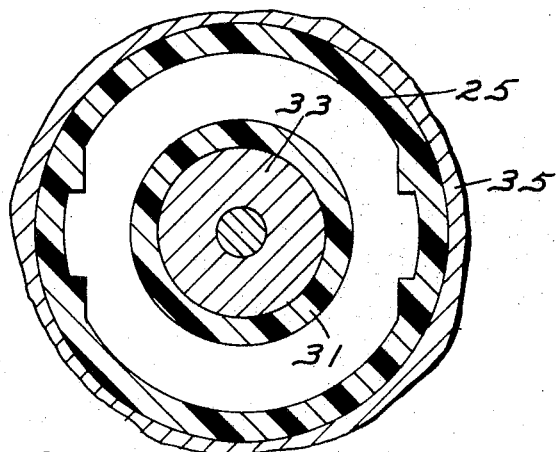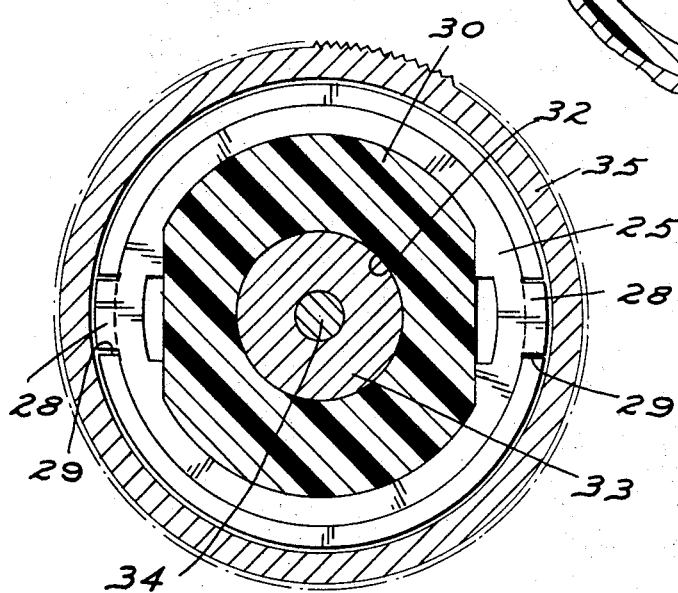

SINGLE HANDLE FAUCET VALVE

This application is a division of application Ser. No. 573,601 filed August 19, 1966, now abandoned.

This invention relates to single handle faucet valves.

Among the objects of the invention are to provide an improved single handle faucet valve which is capable of being rotated to turn the water on or off and oscillated to control the mixture of hot and cold water that is provided wherein the operation of rotating to shut off the valve does not affect the setting of mixture of hot and cold water so that the mixture of hot and cold water remains unaffected and is the same when the valve is rotated to once again turn the water on; which is capable of long life; which is relatively free of maintenance; and which can be readily assembled and disassembled.

In the drawings:

FIG. 3 is a side elevational view of a portion of the valve shown in FIG. 1 removed from the valve;

FIG. 4 is a fragmentary sectional view taken along the line 4—4 in FIG. 1;

FIG. 5 is a fragmentary sectional view taken along the line 5—5 in FIG. 1;

FIG. 6 is a fragmentary sectional view taken along the line 6—6 in FIG. 1; and

Figure 1:
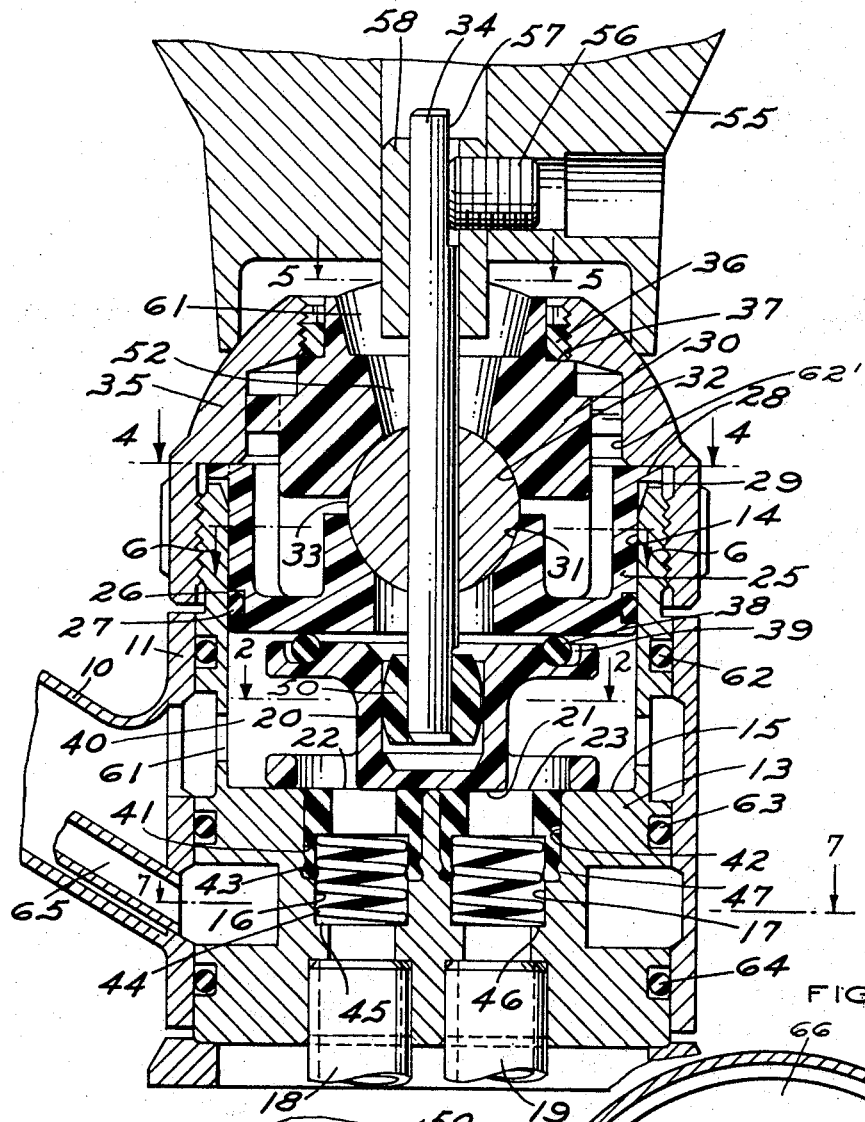
FIG. 1 is a vertical sectional view through a valve embodying the invention.

Referring to FIG. 1, the faucet valve embodying the invention is adapted to be used with various spout configurations including the type shown in FIG. 1 wherein a spout 10 has a sleeve or cylinder 11 attached thereto and rotatably mounted on the single handle faucet valve.

The single handle faucet valve comprises a body 13 that is formed with a cylindrical chamber or opening 14 that opens upwardly to the upper end of the body. The bottom surface 15 of the chamber 14 is substantially flat and inlet passages 16, 17 extend upwardly from the bottom of the body through the surface 15. Hot and cold water, respectively, are supplied to the passages 16, 17 through inlet pipes 18, 19 which are swaged or otherwise provided in the openings.

Figures 2, 7:
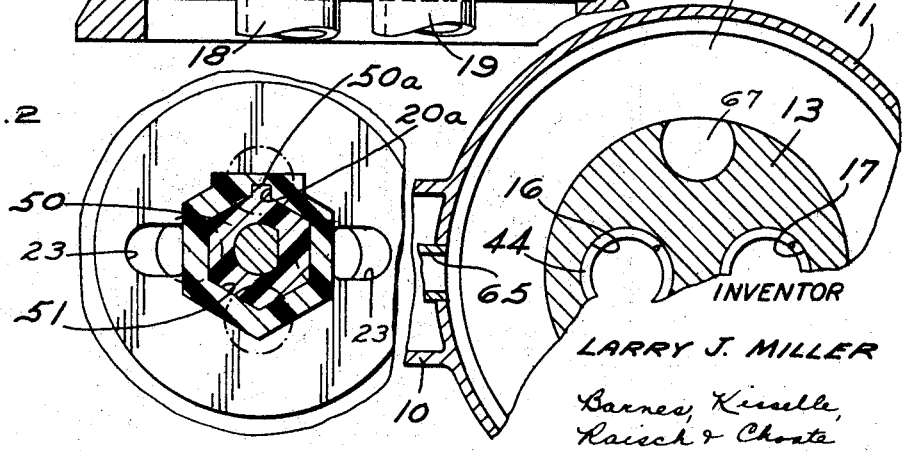
FIG. 2 is a fragmentary sectional view taken along the line 2—2 in FIG. 1.
FIG. 7 is a fragmentary sectional view taken along the line 7—7 in FIG. 1.

A control disc 20, which is preferably made of a low friction plastic material that is rigid, non-deformable and resistant to hot water, such as Delrin, is provided in the chamber 14. Control disc 20 is formed with a substantially flat bottom surface 21 that engages the flat surface 15 of the chamber 14. The disc 20 is provided with non-circular circular openings 22, 23 that are adapted to be moved into registry with the upper ends of openings 16, 17 as shown in FIG. 2.

A sealing member 25 is provided in the upper end of chamber 14 and has a peripheral circular groove 26 in which an O-ring 27 of resilient material such as synthetic rubber is provided to form a seal with the wall of the chamber 14. The upper end of sealing member is provided with radially extending diametrically opposed projections 28 that extend into complementary depressions 29 in the upper end of the body 13 and thereby prevent rotation of the sealing member 25 relative to the body 13. A retaining member 30 of low friction material similar to the material of which the sealing member 25 is made is provided on the upper end of the body. Sealing member 25 and retaining member 30 have spherical seats 31, 32, respectively, which engage a spherical member 33, preferably of material that is dissimilar to that of members 25, 30 such as brass, that is fixed intermediate the ends of an operating lever 34. The retaining member 30 is urged downwardly against the spherical member 33 by a cap 35 that is threaded on the upper end of the body 13. An adjusting ring 36 is threaded in an opening in the upper end of the cap 35 and engages a shoulder 37 on the retaining member 30. The force of the retaining member 30 on the spherical member 33 and, in turn, the sealing disc 25 urges the sealing disc 25 downwardly against an O-ring 38 that is provided in a groove 39 in the upper end of the control disc 20 thereby yieldingly urging the control disc 20 downwardly toward the flat surface 15 of the chamber 14.

By this arrangement, water may flow upwardly into chamber 40 but is prevented by O-ring 38 and O-ring 27 from moving upwardly and outwardly of the body 13.

The upper ends 41, 42 of the inlet passages 16, 17 are enlarged to receive annular sealing members 43 of rubber or other suitable resilient material to provide a seal with the undersurface 21 of the control disc 20. In order to insure this seal, coil springs 44 are compressed between shoulders 45, 46 of the body and shoulders on the sealing rings 43. In addition, to insure that water will not seep between the surfaces of the enlarged openings 41, 42 and the respective sealing members 43, the lower end of each sealing member 43 has a bead 47 on the outer surface thereof integral with the member to provide a secondary seal in the nature of an O-ring seal.

As shown in FIGS. 1 and 2, an interconnecting member 50 of low friction material such as Delrin is fixed on the lower end of the lever 34 as by press fitting the member on a non-circular portion of the lever herein shown as having a D cross section. The spherical member 50 is polygonal in horizontal cross section, herein shown as hexagonal, and spherical in vertical cross sections. Interconnecting member 50 engages an opening 51 in the upper end of the control disc 20 which has a complementary polygonal cross section and vertical side walls. By this arrangement, rotation of the lever 34 will cause rotation of the control disc 20. At the same time, oscillation of the control lever 34 will translate the control disc 20 along surface 15 without losing the sealing engagement of the control disc 20 with the sealing members 43. In order to facilitate proper assembly of the control disc 20, a vertical key 50a on the interconnecting member 50 engages a keyway 20a in the control disc 20.

The lever 34 is substantially circular in cross section and extends upwardly through an opening in the sealing disc 25 and through an intermediate opening 52 in the retaining member 30. Opening 52 has a width substantially equal to the width of the lever 34 and a length greater than this width so that the movement of the lever 34 is confined to a substantially single plane to the right or left as viewed in FIG. 1.

A stop member 58 is press fitted in an opening in a knob 55 and is fixed on the upper end of the lever 34 by a set screw 56 which is threaded into knob 55 and through an opening in stop member 58 into engagement with a flat surface 57 on the upper end of the lever 34. As shown in FIG. 5, the stop member 58 has diametrically opposed ears 59 that are adapted to engage the sides 60 of an elongated opening 61 in the upper end of the retaining member 30 to limit the rotational movement of the lever 34 and, in turn, the control disc 20.

As shown in FIG. 3, the retaining member 30 has a non-circular cross section and extends downwardly to a complementary opening in the upper end of the sealing member 25. As shown in FIGS. 1 and 3, retaining member 30 has circumferentially spaced projections 30' that engage an inner wall 62' of cap 35 to facilitate assembly.

By the above arrangement, swinging of the lever 34 in the single plane controlled by the slot 52 causes the control disc 20 to move back and forth, while rotation of the lever causes the control disc 20 to rotate.

By rotating the control knob 55 and, in turn, the lever 34, the openings 22, 23 in the control disc are moved from positions in registry with the inlets 16, 17 to positions out of registry thereby controlling the total amount of water flowing through the inlets into the chamber or space 40.

By swinging the lever back and forth, the extent of communication or registry of the openings 22, 23 with the passages 16, 17 is controlled. Thus, by moving the lever to the left or counterclockwise as shown in FIG. 1, substantially the entire opening 22 may be brought into registry with the inlet passage 16 and the opening 23 moved out of registry with the inlet 17 so that only hot water will flow. By swinging the lever to the right or clockwise, substantially the entire opening 23 may be brought into registry with the inlet passage 17 so that only cold water will flow. Thus by swinging the lever, the extent of the mixture of hot and cold water is varied.

The area 40 communicates through a passage 61 in the body with the interior spout 10. A seal is provided between the body 13 and sleeve 11 of the spout by O-rings 62, 63, 64.

In accordance with well-known faucet valve construction, suitable means may be provided on the end of the spout 10 to return the water through a tube 65 into an annular passage 66 in the body 13 and downwardly through an outlet 67 and, in turn, a rinse tube (not shown).

It can thus be seen that there has been provided a faucet valve which will effectively and efficiently control the flow of hot and cold water. The faucet can be turned on and off without affecting the degree of registry of the control disc with the inlet passages. Specifically, at any angular position of the handle, representing a specific water setting of either hot, cold or mixed hot and cold, the handle can be rotated to and from "on" and "off" position without affecting the water setting. In addition, the water setting can be made before the knob is rotated to "on" position.

The provision of the stop member 58 in close proximity to and on the knob 55 causes the stop force that is encountered when torque is applied to the knob to move the control disc to "on" and "off" position to be transferred from the handle or knob 55 directly to the insert 58 minimizing the torque which is applied to the lever 34 and thereby preventing excess torque on the lever 34. In addition, the provision of the stop 58 adjacent the knob causes a very minimum tendency to bend the lever 34.

I claim:
1. In a single handle faucet valve, the combination comprising:
   means defining a chamber;
   said chamber having a substantially flat wall surface along one wall;
   hot and cold water inlets extending through said surface to said chamber;
   a control disc having a complementary flat surface;
   said disc having spaced openings therein movable into and out of registry with said inlets;
   a sealing member spaced from said substantially flat wall surface;
   sealing means interposed between said sealing member and control member providing a seal therebetween and yieldingly urging said control member toward said substantially flat surface;
   a lever;
   a spherical member fixed on said lever;
   said sealing member having a complementary spherical surface thereon which is engaged by said spherical member;
   a retaining member having a complementary spherical surface engaging said spherical member whereby said spherical member is journalled for rotation and swinging movement on said sealing member;
   means for guiding said lever for movement; and
   means interconnecting one end of said lever with said control disc.

2. The combination set forth in claim 1 including means for varying the force between said sealing member and said control disc.

3. In a single handle faucet valve, the combination comprising:
   means defining a chamber;
   said chamber having a substantially flat wall surface along one wall;
   hot and cold water inlets extending through said surface to said chamber;
   a control disc having a complementary flat surface;
   said disc having spaced openings therein movable into and out of registry with said inlets;
   a sealing member spaced from said substantially flat wall surface;
   sealing means interposed between said sealing member and control member providing a seal therebetween and yieldingly urging said control member toward said substantially flat surface;
   a lever;
   a spherical member fixed on said lever;
   said sealing member having a complementary spherical surface thereon which is engaged by said spherical member;
   a retaining member having a complementary spherical surface engaging said spherical member;
   means engaging and holding said retaining member against said spherical member whereby said spherical member is journalled for rotation and swinging movement on said sealing member;
   means for guiding said lever for movement; and
   means interconnecting one end of said lever with said control disc.

4. The combination set forth in claim 3 including means for varying the force between said sealing member and said control disc.